April 8, 1924. 1,489,316

M. B. A. DORING

SPEED CHANGING DEVICE

Filed Dec. 10, 1921   2 Sheets-Sheet 1

Inventor
Max B. A. Doring
By his Attorney
Leo J. Matty

April 8, 1924. 1,489,316
M. B. A. DORING
SPEED CHANGING DEVICE
Filed Dec. 10, 1921 2 Sheets-Sheet 2
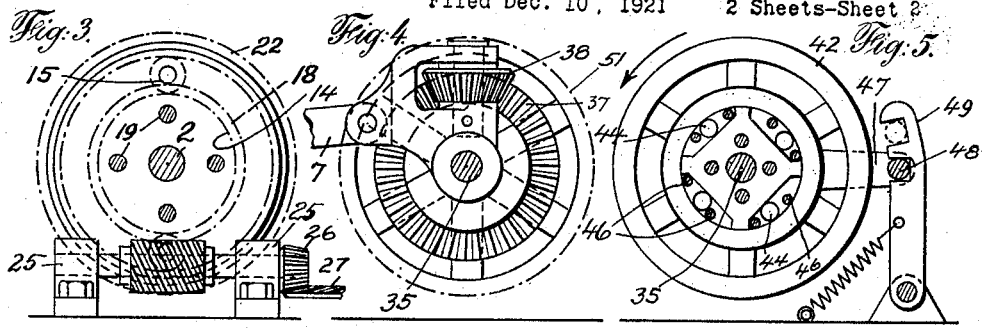
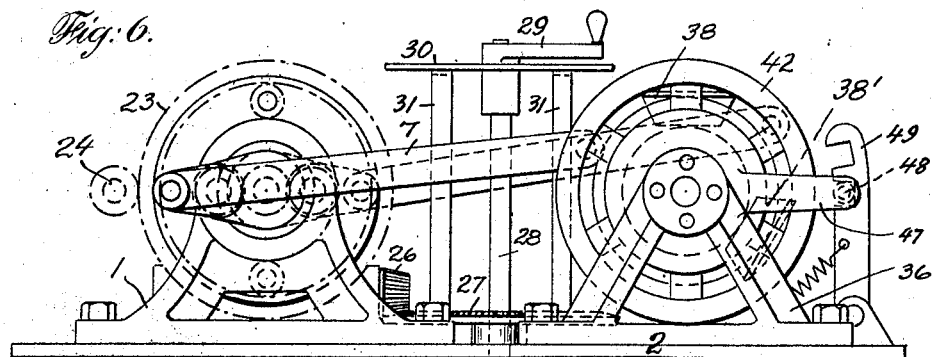
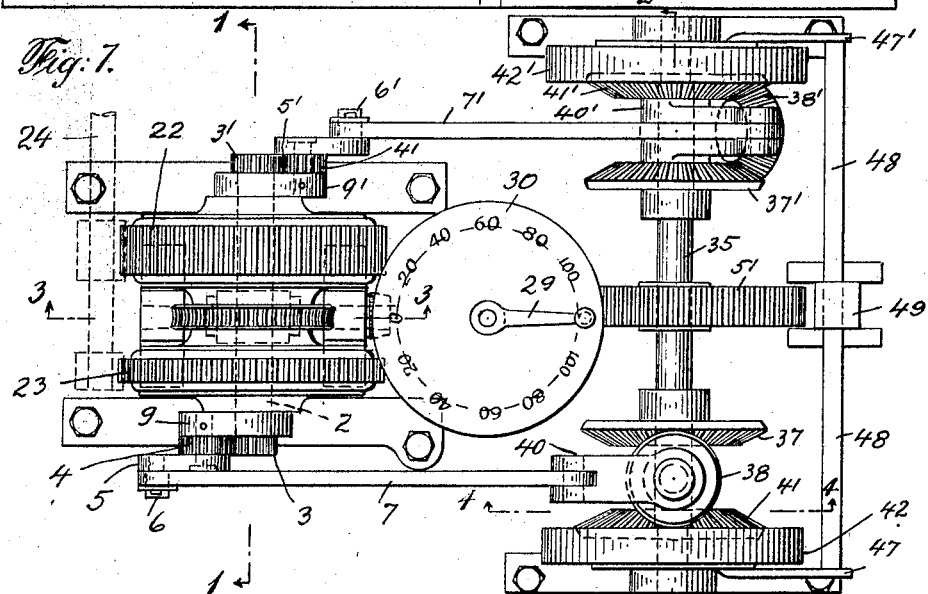
Inventor
Max B. A. Doring
By his Attorney
Leo J. Matty Patented Apr. 8, 1924.

1,489,316

UNITED STATES PATENT OFFICE.

MAX B. A. DORING, OF BROOKLYN, NEW YORK.

SPEED-CHANGING DEVICE.

Application filed December 10, 1921. Serial No. 521,332.

*To all whom it may concern:*

Be it known that I, MAX B. A. DORING, a citizen of the German Republic, but have declared my intention to become a citizen of the United States of America, and a resident of Brooklyn, in the county of Kings and State of New York, have invented certain new and useful Improvements in Speed-Changing Devices, of which the following is a specification.

This invention relates to a speed changing device and the objects of the invention are to provide a device in which the speed changes are made with gears that are always in mesh. Further objects of the invention are to provide a device that is adapted to vary the speed from zero to a maximum either forward or backward as may be desired.

To the accomplishment of the above objects and to such others as may hereinafter appear the invention comprises means for varying the throw of a crank arm from a neutral to a maximum position, and to means for transmitting reciprocating motion, received from said crank arm, to means for rotating a shaft. The invention further comprises means for reversing the action of said shaft rotating means, for reversing the direction of rotation of said shaft.

Referring to the drawings—

Figure 3 is a cross sectional detail of the means for varying the throw of the crank arms shown in Fig. 1, on line 3—3 of Fig. 7.

Figure 4 is a cross sectional detail of the means for rotating a shaft shown in Fig. 2 on line 4—4 of Fig. 7.

Figure 5 is a cross sectional detail of the means for rotating a shaft shown in Fig. 2 on line 5—5 of Fig. 2.

Figure 6 is a side elevation of the means shown in Figs. 1 and 2.

Figure 7 is a plan view of Fig. 6.

Figure 1:
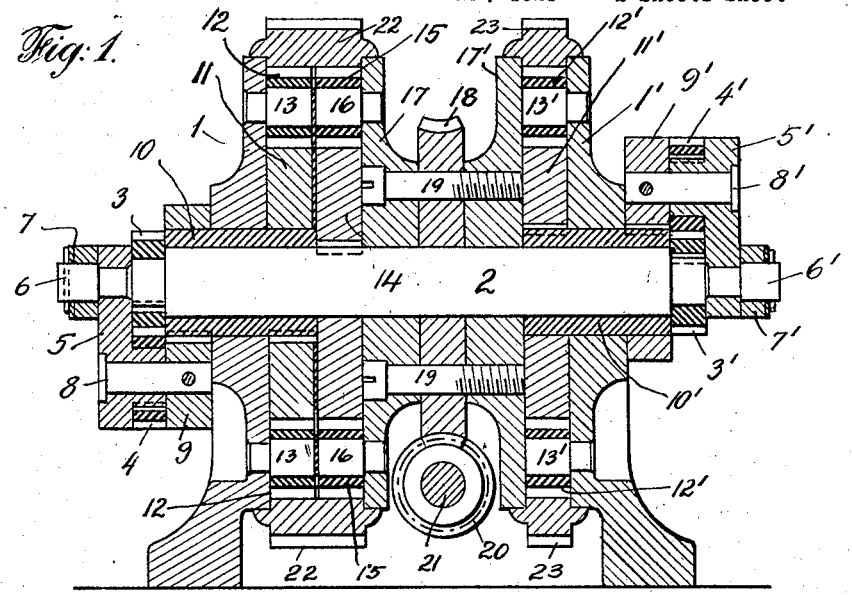
Figure 1 is a longitudinal section of means for varying the throw of two crank arms, made in accordance with the invention on line 1—1 of Fig. 7.
Figure 2:
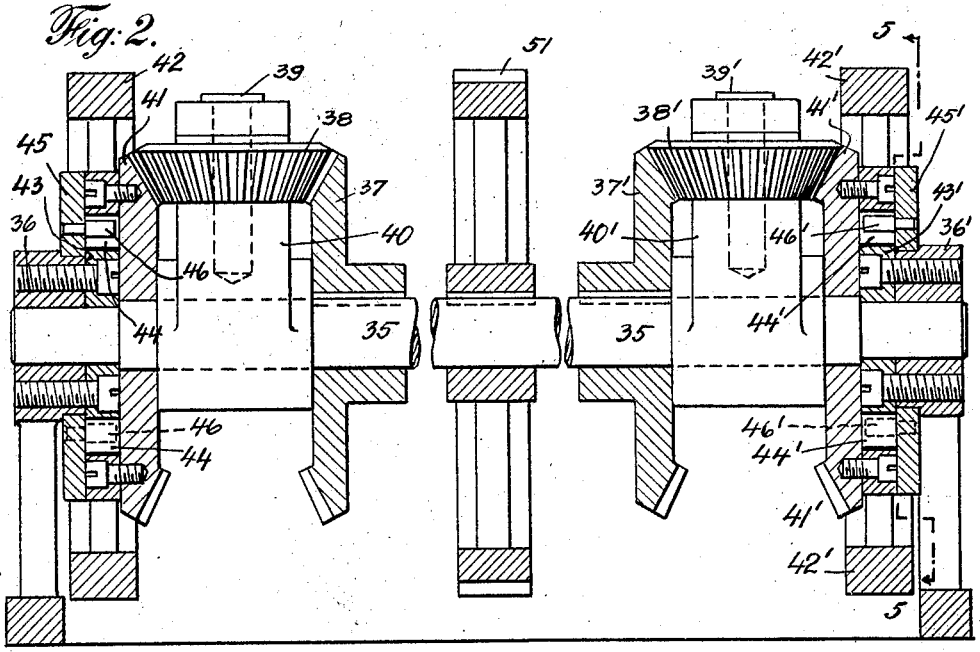
Figure 2 is a longitudinal section of means for rotating a shaft, made in accordance with the invention on line 2—2 of Fig. 7.

In the drawings 1, 1' designate two bearing standards in which is rotatably mounted a controller shaft 2 having keyed to one end a spur gear 3 and to the other end a similar spur gear 3'. The spur gear 3 is arranged to mesh with a spur gear 4 and the spur gear 3' is arranged to mesh with a similar spur gear 4'. The spur gear 4 is keyed to a projecting boss on a crank arm 5 and the spur gear 4' is keyed to a similar projecting boss on a similar crank arm 5'.

The crank arm 5 is provided at its free end with a crank pin 6 forming a pivot for a connecting link 7, and the crank arm 5' is provided at its free end with a similar crank pin 6' forming a pivot for a similar connecting link 7'. The other end of the crank arm 5 is pivoted on a pivot pin 8 secured to an auxiliary crank arm 9, and the other end of the crank arm 5' is similarly pivoted on a pivot pin 8' secured to a similar auxiliary crank arm 9'.

The crank arm 9 is keyed to a sleeve 10 suitably journaled in the bearing standard 1 the same being rotatably mounted on the controller shaft 2. The crank arm 9' is keyed to a similar sleeve 10' suitably journaled in the bearing standard 1' the same being also rotatably mounted on the controller shaft 2.

The inner end of the sleeve 10 is keyed to a spur gear 11 which meshes with idler gears 12 rotatably mounted on studs 13 secured to bearing standard 1. The inner end of the sleeve 10' is also keyed to a spur gear 11' which meshes with similar idler gears 12' rotatably mounted on similar studs 13' secured to bearing standard 1'.

Suitably keyed to the controller shaft 2 adjacent the spur gear 11 is a spur gear 14, which meshes with idler gears 15 rotatably mounted on studs 16 secured to a circular flange 17. The circular flange 17 together with a similar flange 17' are made, in the present instance, to embrace a worm wheel 18, secured together by means of suitable countersunk bolts 19, the circular flanges 17 and 17' together with the worm gear 18 being rotatably mounted upon the controller shaft 2.

The circular flange 17 has on its outer periphery a suitable bearing surface which corresponds with a similar peripheral bearing surface on the inner face of the bearing standard 1, upon which is rotatably mounted a gear ring 22, provided with inner and outer teeth. The circular flange 17' has also on its outer periphery a suitable bearing surface which corresponds with a similar peripheral bearing surface on the inner face of the bearing standard 1' upon which is rotatably mounted a gear ring 23 provided with inner and outer teeth.

The internal teeth of the gear ring 22 are arranged to mesh with the idler gears 12 and 15. The internal teeth of the gear ring 23 are arranged to mesh with the idler gears 12'.

The external teeth of the gear rings 22 and 23 are arranged to mesh with suitable similar pinions secured to a power shaft 24 as indicated in dotted lines in Figures 6 and 7.

The worm wheel 18 is arranged to engage a worm 20 secured to a worm shaft 21 mounted in bearings 25. A bevel pinion 26 is secured to one end of the worm shaft 21 and is arranged to mesh with a bevel gear 27 secured to one end of a vertical shaft 28, which has secured to its other end a controller handle 29. The shaft 28 is supported in suitable bearings and is arranged to extend loosely through the center of a suitably graduated dial plate 30 suitably supported on uprights 31.

By referring to Figure 1 it will be seen that the auxiliary crank arms 9 and 9' secured to the sleeves 10 and 10' are arranged, in the present instance, to extend in opposite directions, or one hundred and eighty degrees apart. It will also be seen that the crank arms 5 and 5' pivoted to the ends of the auxiliary crank arms 9 and 9' are set, in the present instance, with the crank pins 6 and 6' in line with the center of the shaft 2, so that when power is transmitted to the gear rings 22 and 23 through the medium of the power shaft 24, to rotate the gear rings and connecting parts no movement of any kind will be transmitted to the connecting links 7 and 7'.

During the above or neutral position of the parts, the worm gear 18, which is connected to the circular flanges 17 one of which supports the idler gears 15, is held in locked position by means of the worm 20. In the present instance in the neutral position of the parts it will be seen that the idler gears 15 are set in direct alignment with the idler gears 12 and 12', so that when power is applied to rotate the gear rings 22 and 23 the idler gears 15, 12 and 12' will act respectively through the spur gears 14 and 11, 11' to rotate the controller shaft 2 and the sleeves 10 and 10' all in the same direction and at the same speed, the controller shaft 2 acting to turn the spur gears 3 and 3' while the sleeves 10 and 10' act to turn the spur gears 4 and 4' at the same speed to keep the crank pins 6 and 6' in line with the center of the shaft 2 so that no movement will be transmitted to the connecting links 7 and 7'.

By turning the controller handle 29 in either direction the same will act through the worm 20 and worm wheel 18 to move the idler gears 15 secured to the circular flange 17 either forward or backward from its neutral position as may be desired. The movement of the idler gears 15 in either direction acts to rotate the spur gears 3 and 3' secured to the controller shaft 2, through the medium of the spur gear 14. The rotation of the spur gears 3 and 3' by the movement of the controller handle 29, in either direction from its neutral position, as just described, acts to move the crank arms 5 and 5' from their position with the crank pins 6 and 6' in line with the center of the controller shaft 2 to any position in either direction up to a maximum position of one hundred and eighty degrees when the crank pins 6 and 6' will each describe a maximum circle, as shown in Figures 6 and 7, in which position a maximum movement will be transmitted to the connecting links 7 and 7'.

From the above description it will be seen that by moving the controller handle 29 from a neutral position in either direction up to one hundred and eighty degrees the crank pins 6 and 6' on the crank arms 5 and 5' can be made to progressively describe any circle from zero to the maximum extended position of the crank arms 5 and 5'. It will also be seen that the controller handle 29 can be moved from its maximum position, in either direction, back to neutral position, and that the crank pins 6 and 6' on the crank arms 5 and 5' can be made to progressively describe any circle from a maximum extended position of the crank arms 5 and 5' to a zero or neutral position.

In the present instance and in accordance with the present invention the connecting link 7 pivoted at one end to the crank pin 6 is pivoted at its other end to an oscillating bracket arm 40 loosely mounted on a driven shaft 35 rotatably mounted in standards 36. The connecting link 7' pivoted at one end to the crank pin 6' is pivoted at its other end to an oscillating bracket arm 40' loosely mounted on the driven shaft 35.

The oscillating bracket arm 40 is provided with a bevel pinion 38 loosely mounted on a stud 39. The oscillating bracket arm 40' is also provided with a bevel pinion 38' loosely mounted on a stud 39'. The bevel pinion 38 is arranged to mesh with a bevel gear 37 keyed near one end of the shaft 35. The bevel pinion 38' is also arranged to mesh with a bevel gear 37' keyed near the other end of the shaft 35 which is provided in the present instance with a gear 51 keyed thereto for transmitting power.

The bevel pinion 38 is also arranged to mesh with a bevel gear 41 which has securely bolted thereto a fly wheel 42, the bevel gear 41 being loosely mounted adjacent one end of the shaft 35. The bevel pinion 38' is also arranged to mesh with a bevel gear 41' which has securely bolted thereto a fly wheel 42', the bevel gear 41' being loosely mounted adjacent the other end of the shaft 35.

The fly wheel 42 is recessed near its center to provide a circular bore about the reduced end of the shaft 35 into which fits a locking plate 43 which has on its periphery a plurality of spaced recesses arranged to hold in each recess a ball cylinder 44. The locking plate 43 is secured to a bearing 36 in which is journaled the reduced end of the shaft 35. The fly wheel 42' is also recessed near its center to provide a circular bore about the other reduced end of the shaft 35, into which fits a locking plate 43' which has on its periphery a plurality of spaced recesses arranged to hold in each recess a ball cylinder 44'. The locking plate 43' is also secured to a bearing 36' in which is journaled the other reduced end of the shaft 35.

A circular disk 45 loosely mounted on the bearing 36 is provided which is arranged to cover the recesses holding the ball cylinders 44. A circular disk 45' is also loosely mounted on the bearing 36' the same being arranged to cover the recesses holding the ball cylinders 44'.

The circular disk 45 is provided with a series of pins 46 secured thereto, which are arranged to extend into the locking plate recesses, two pins 46 being provided for each recess one on each side of its respective ball cylinder 44. The circular disk 45' is also provided with a series of pins 46' secured thereto, which are arranged to extend into the locking plate recesses, two pins 46' being provided for each recess, one on each side of its respective ball cylinder 44'.

The circular disks 45, 45' are each provided with an arm 47 47' the ends of which are secured to the opposite ends of a bar 48, arranged to engage a spring pressed locking lever 49 in one of two positions, suitable notches in the locking lever 47 being provided for this purpose.

From the above description it will be seen, by referring to Figure 5 that the fly wheels 42, 42', in the position illustrated, are free to rotate in the direction of the arrow or in a counter clockwise direction, the arms 47, 47' acting through one set of locking pins 46, 46' to hold the ball cylinders 44, 44' in neutral or rolling position. When however it is attempted to rotate the fly wheels 42, 42' in the opposite direction or clockwise, the fly wheels are locked against turning movement by the ball cylinders 44, 44' wedging themselves against the converging surfaces of the locking plates, 43, 43' and the fly wheel bores.

When the arms 47, 47' are set in the upper notch of the locking lever 49 the same will act to bring the other set of locking pins 46, 46' in operative position to permit the fly wheels 42, 42' to rotate freely in a direction opposite to the direction of the arrow or in a clockwise direction, the position of the locking pins 46, 46' being such as to permit the ball cylinders 44, 44' to wedge themselves to lock the fly wheels against turning movement in a counter clockwise direction.

From the above description it will be seen that, when in the operation of the device power is applied to the power shaft 24 to rotate the gear rings 22 and 23, and the controller lever 29 is set, as before described, to set the crank pins 6 and 6' on the crank arms 5 and 5' away from the center of the controller shaft 2, the crank arms 5 and 5' will act to reciprocate the links 7 and 7'.

The reciprocation of the links 7 and 7' acts to oscillate the bracket arms 40 and 40' loosely mounted on the driven shaft 35, as before described.

When the bracket arm 40 together with the bevel pinion 38 is oscillated from left to right, as the parts are shown in Figure 7, rotary movement will be transmitted to the driven shaft 35 through the medium of the bevel gear 37, in a clockwise direction. Due to the fact that the bevel gear 41 is, in the present instance, locked against movement in a clockwise direction, together with the fly wheel 42 with which it is connected, the bevel pinion 38 during its oscillatory movement from left to right will roll upon the bevel gear 41, with which it is in mesh, to thereby accelerate the speed of movement transmitted to the bevel gear 37, with which the bevel pinion is also in mesh, to thereby accelerate the speed of movement of the driven shaft 35 transmitted through the oscillations of the bracket arm 40.

When the link 7 has acted during its reciprocation, as just described, to move the bracket arm 40 to its extreme right hand position, the other link 7' has acted to move its respective bracket arm 40' and with it its bevel pinion 38' to its extreme left hand position, crank arm 5 in the present instance being set as before described one hundred and eighty degrees ahead of the crank arm 5'. The movement of the bracket arm 40' from its extreme left hand position to its extreme right hand position acts to lock the bevel gear 41' and to transmit motion at accelerated speed to the bevel gear 37' through the medium of the bevel pinion 38', to thereby accelerate the speed of movement of the driven shaft 35 in the same manner as the movement of the bracket arm 40 from its extreme left hand position to its extreme right hand position accelerates the speed of movement of the driven shaft 35.

When the bracket arm 40 has been moved to its extreme right hand position and the further reciprocation of the link 7 acts to move or oscillate the bracket arm 40 to the left, the bevel pinion 38 will act to rotate the fly wheel 42 in a counter clockwise direction, in which direction it is free to rotate, accelerated speed being given to the fly wheel 42 due to the fact that the bevel pinion 38 rolls in its movement from right to left over the surface of the bevel gear 37, with which it is in mesh, a further acceleration being given to the fly wheel 42 as the bevel gear 37 is being turned in a clockwise direction by the simultaneous movement of the bracket arm 40' with the bevel pinion 38' from left to right through the action of the link 7'.

When the bracket arm 40 has been moved or oscillated from its extreme left hand position to its extreme right hand position and back to its extreme left hand position the fly wheel 42 due to its weight is still rotating in a counter clockwise direction, so when the bracket arm 40 is again moved from its extreme left hand position to its extreme right hand position, the rotating fly wheel 42 acts to accelerate the speed or transmit power through the medium of the bevel pinion 38 and the bevel gear 37 to the driven shaft 35, to thereby regulate or synchronize the power transmitted by reciprocating movement of the link 7 from the driving shaft 24 to the driven shaft 35.

The bracket arm 40' and its bevel pinion 38' acts in the same manner to rotate the fly wheel 42' which also acts to regulate and synchronize the power transmitted by reciprocating movement of the link 7' from the driving shaft 24 to the driven shaft 35.

Due to the fact that the crank arms 5 and 5' are set in the present instance one hundred and eighty degrees apart the action of the fly wheel 42 acts to balance the action of the fly wheel 42' and vice versa.

The movement transmitted to the driven shaft 35 can be reversed at any time by resetting the arm 47 to change the direction of rotation of the fly wheels 42 and 42' as will be readily understood from the foregoing description.

While the invention has been described with particular reference to the details of construction the same is not to be considered as limited thereto as many changes can be made and still fall within the scope of the invention set forth in the following claims.

What I claim is:—

1. A speed changing device comprising in combination a controller shaft, a crank arm rotatably mounted on each end of said controller shaft, means for adjustably connecting said crank arms with said controller shaft, and geared means always in mesh for varying the throw of said crank arms.

2. A speed changing device comprising in combination a controller shaft, a crank arm rotatably mounted on each end of said controller shaft, means for adjustably connecting said crank arms with said controller shaft, and geared means always in mesh for varying the throw of said crank arms in either direction.

3. A speed changing device comprising in combination a controller shaft, a crank arm rotatably mounted on each end of said controller shaft, means for adjustably connecting said crank arms with said controller shaft, and geared means always in mesh for varying the throw of said crank arms while the controller shaft is rotating.

4. A speed changing device comprising in combination a controller shaft, a crank arm rotatably mounted on each end of said controller shaft, means for adjustably connecting said crank arms with said controller shaft, and geared means always in mesh for varying the throw of said crank arms in either direction while the controller shaft is rotating.

5. A speed changing device comprising in combination a controller shaft, a crank arm rotatably mounted on each end of said controller shaft, intermeshing gears secured respectively to each end of said controller shaft and to each crank arm, and geared means always in mesh for rotating said gears in relation to each other to vary the throw of each crank arm.

6. A speed changing device comprising in combination a controller shaft, a crank arm rotatably mounted thereon, means for adjustably connecting said crank arm with said controller shaft, a gear ring having internal gear teeth, a gear secured to said controller shaft, a gear operatively connected to said crank arm, idler gears meshing respectively with the gear on said controller shaft and the gear operatively connected to said crank arm with the internal teeth of said gear ring, and means for operating the idler gears to vary the throw of the crank arm.

7. A speed changing device comprising in combination a controller shaft, a crank arm rotatably mounted thereon, means for adjustably connecting said crank arm with said controller shaft, a gear ring having internal gear teeth, a gear secured to said controller shaft, a gear operatively connected to said crank arm, idler gears meshing respectively with the gear on said controller shaft and the gear operatively connected to said crank arm with the internal teeth of said gear ring, and means for operating the idler gears meshing with the gear connected to said controller shaft to vary the throw of the crank arm.

8. A speed changing device comprising in combination a controller shaft, a crank arm rotatably mounted thereon, means for adjustably connecting said crank arm with said controller shaft, a gear ring having internal gear teeth, a gear secured to said controller shaft, a gear operatively connected to said crank arm, two sets of idler gears, meshing respectively with the gear on said controller shaft and the gear operatively connected to said crank arm with the internal teeth of said gear ring, and means for shifting the position of one set of idler gears to vary the throw of the crank arm.

9. A speed changing device comprising in combination a controller shaft, a crank arm rotatably mounted thereon, means for adjustably connecting said crank arm with said controller shaft, a gear ring having internal gear teeth, a gear secured to said controller shaft, a gear operatively connected to said crank arm, two sets of idler gears meshing respectively with the gear on said controller shaft and the gear operatively connected to said crank arm with the internal teeth of said gear ring, and means for shifting the position of the set of idler gears meshing with the gear connected to said controller shaft to vary the throw of the crank arm.

In testimony whereof I have signed this specification in the presence of two subscribing witnesses.

MAX B. A. DORING.

Witnesses:
 LEO J. MATTY,
 LOUIS E. FOUTS.